United States Patent [19]

Corrigan

[11] Patent Number: 5,106,792
[45] Date of Patent: Apr. 21, 1992

[54] CBN/CBN COMPOSITE MASSES AND THEIR PREPARATION

[75] Inventor: Francis R. Corrigan, Columbus, Ohio

[73] Assignee: General Electric Company, Worthington, Ohio

[21] Appl. No.: 630,916

[22] Filed: Dec. 20, 1990

[51] Int. Cl.⁵ .............................................. C04B 35/58
[52] U.S. Cl. ....................................... 501/96; 51/307; 51/309
[58] Field of Search .................... 51/307, 309; 501/96; 423/290

[56] References Cited

U.S. PATENT DOCUMENTS

| | | | |
|---|---|---|---|
| 3,150,929 | 9/1964 | Wentorf, Jr. | 51/307 |
| 3,212,351 | 10/1965 | Bundy et al. | 51/307 |
| 3,212,852 | 10/1965 | Bundy | 51/307 |
| 3,233,988 | 2/1966 | Wentorf, Jr et al. | 51/307 |
| 3,743,489 | 7/1973 | Wentorf, Jr. et al. | 51/307 |
| 3,767,371 | 10/1973 | Wentorf, Jr. et al. | 51/307 |
| 3,918,219 | 11/1975 | Wentorf, Jr. et al. | 51/307 |
| 4,188,194 | 2/1980 | Corrigan | 51/307 |
| 4,289,503 | 9/1981 | Corrigan | 51/307 |
| 4,349,517 | 9/1982 | Lysanov et al. | 51/307 |
| 4,389,223 | 6/1983 | Corrigan | 51/307 |

Primary Examiner—William R. Dixon, Jr.
Assistant Examiner—Anthony J. Green
Attorney, Agent, or Firm—Mueller and Smith

[57] ABSTRACT

Broadly, the present invention is directed to a high pressure/high temperature (HP/HT) process for making polycrystalline CBN composite masses from graphitic boron nitride (GBN) in the substantial absence of catalytically-active material. The present invention specifically comprises subjecting a mixture of different structural forms of GBN to simultaneous conversion of each for making a CBN/CBN composite mass. Pyrolytic boron nitride/hexagonal boron nitride (PBN/HBN) mixtures are ideally suited for conversion into the inventive CBN/CBN composite masses of the present invention.

7 Claims, 2 Drawing Sheets

BUNDY & WENTORF BN PHASE DIAGRAM

BUNDY & WENTORF BN PHASE DIAGRAM

CBN/CBN COMPOSITE MASSES AND THEIR PREPARATION

BACKGROUND OF THE INVENTION

The present invention relates to a process for making polycrystalline cubic boron nitride (CBN) from graphitic boron nitride (GBN) and more particularly to a direct conversion process for making CBN/CBN composite masses using high pressure/high temperature (HP/HT) processing conditions.

Three crystalline forms of boron nitride are known: (1) soft graphitic (hexagonal) form (HBN) similar in structure to graphite carbon, (2) a hard wurtzitic (hexagonal) form (WBN) similar to hexagonal diamond, and (3) a hard zincblende (cubic) form (CBN) similar to cubic diamond. The three boron nitride (BN) crystal structures may be visualized as formed by stacking of a series of sheets (layers) of atoms. In the low pressure graphitic structure, the stacking layers are made of plane or fused hexagons (like bathroom tile) in which the vertices of the hexagons are occupied alternately by boron and nitrogen atoms and stacked vertically such that the B and N atoms also alternate in the stacking [001] direction. In the more dense CBN and WBN crystal structures, the atoms of the stacking layers are puckered out-of-plane and the two dense structures result from variation in the stacking of the layers.

In HBN and WBN crystals the layers are stacked along the [111] direction. These layers are referred to as hexagonal stacking layers or planes. In HBN, bonding between the atoms within the layers if predominantly of the strong covalent type, but with only weak van der Waals bonding between layers. In WBN and CBN, strong, predominantly covalent tetrahydral bonds are formed between each atom and its four neighbors.

Known processes for making polycrystalline CBN compacts and mesh CBN can be generally classified in four categories as follows: (1) catalytic conversion process, a one-step process in which a catalyst metal or alloy aids in the transition of HBN to CBN simultaneously with the formation of single-crystal CBN particles or a compact thereof; (2) bonding medium process, a two-step process in which the first step comprises the conversion of HBN to CBN and the second step comprises the formation of a compact from cleaned CBN crystals mixed with a metal or alloy which aids int he bonding of the CBN into a compact; (3) direct sintering process, a two-step process which is the same as process (2) except that the compact is formed without addition of metal or alloy to aid in bonding CBN crystals; and (4) direct conversion process, a one-step process in which substantially pure HBN is transformed directly to a CBN compact or polycrystalline CBN particles without the aid of a catalyst and/or a bonding medium.

The catalytic and bonding medium processes generally are disadvantageous because the catalyst and bonding medium are lower in hardness than CBN and are retained in the resultant mass, thus reducing the hardness and abrasive resistance thereof. Particular reference can be made to U.S. Pat. Nos. 3,233,988 and 3,918,219 for a more detailed discussion of catalytically formed CBN compacts and to U.S. Pat. Nos. 3,743,489 and 3,767,371 for the details of CBN compacts utilizing a bonding medium.

A preferred direct conversion process is disclosed in U.S. Pat. No. 4,188,194 wherein a sintered polycrystalline CBN compact is made by placing preferentially oriented pyrolytic hexagonal boron nitride (PBN) in a reaction cell wherein the boron nitride is substantially free of catalytically active materials. The cell and the contents then are compressed at a pressure of between about 50 Kbars and 100 Kbars while being heated to a temperature of at least about 1800° C. within the CBN stable region of the BN phase diagram. The HP/HT conditions then are maintained for a period of time sufficient for the pyrolytic boron nitride to transform into a sintered polycrystalline cubic boron nitride compact. When HBN is milled to a small particle size (large surface area), an improvement in such process is disclosed in U.S. Pat. No. 4,289,503 wherein boric oxide is removed from the surface of the HBN powder before the conversion process. Such pretreatment is carried out at a temperature in the hexagonal boron nitride thermal decomposition range and is accomplished by vacuum firing and heating under vacuum or inert atmosphere.

Variable structured multicrystalline CBN/CBN composites heretofore have involved the addition of expensive single crystal CBN to the GBN to be converted into CBN. While such variable structure can improve the performance of such abrasives in grinding applications, the expense of the single crystal CBN remains a problem. The same holds for such variable structured masses when their thermal conductivity is the property desired.

BROAD STATEMENT OF THE INVENTION

Broadly, the present invention is directed to a high pressure/high temperature (HP/HT) process for making polycrystalline CBN composite masses from graphitic boron nitride (GBN) in the substantial absence of catalytically-active material. The present invention specifically comprises subjecting a mixture of different structural forms of GBN to simultaneous conversion of each for making a CBN/CBN composite mass. Pyrolytic boron nitride/hexagonal boron nitride (PBN/HBN) mixtures are ideally suited for conversion into the inventive CBN/CBN composite masses of the present invention.

Advantages of the present invention include the preparation of variable structure CBN/CBN composite masses without the need for single crystal CBN. Another advantage is the preparation of such masses in a one-step high pressure process. A further advantage is the improvement in performance of CBN composite masses in grinding applications exhibited by the inventive CBN/CBN composite masses. Yet a further object is the improvement of thermal conductivity of multigrain CBN/CBN composite masses. These and other advantages will be readily apparent to those skilled in the art based upon the disclosure contained herein.

FIG. 1 is the Bundy-Wentorf boron nitride phase diagram as published by Bundy and Wentorf, *J. P. Chem. Phys*, 38, 1144–1149 (1963). In this diagram, AB is the phase equilibrium boundary for CBN and HBN. Pressures above EB in the region EBC, spontaneous conversion of HBN to either WBN or CBN was found to occur. At the lower temperatures, to the left of the hashed marked area FB, and region FBE, the predominate mode of conversion was the WBN. At the higher temperatures to the right of FB, in region FBC, the predominate mode of conversion was CBN.

FIG. 2 is a light transmissive photomicrograph of a sample of the CBN/CBN product made in Example 4.

DETAILED DESCRIPTION OF THE INVENTION

Figure 1:
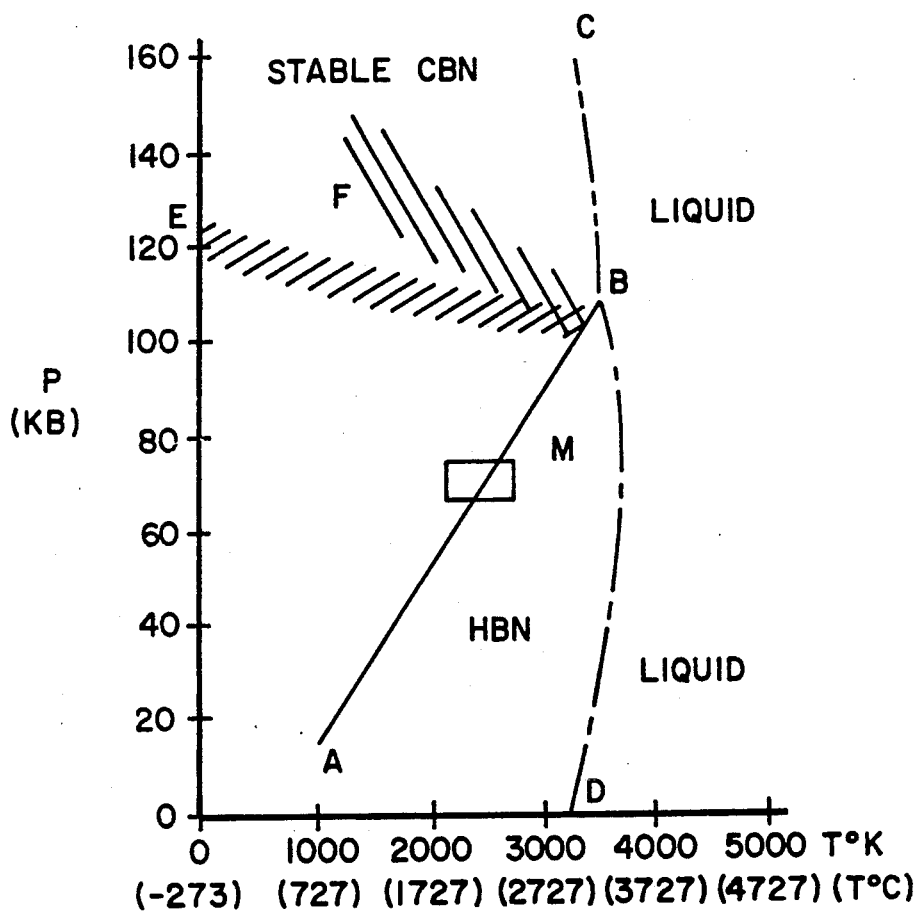

The invention is implemented by placing the desired GBN mixtures in a suitable high pressure cell which then is placed in a suitable high pressure apparatus, and the pressure and temperature raised to conditions which result in direction conversion of the various HBN components to the hard cubic phase. The HP/HT conditions, apparatus, and procedure for carrying out such direct conversion are detailed in the references cited above, particularly U.S. Pat. No. 4,188,194.

After recovery, the resultant CBN/CBN composite mass can be cleaned, and may be milled to mesh size particles for grinding applications or shaped to size for turning, thermode, or heat skin applications. Because the process is carried out by direct conversion, the structure of the CBN formed at any given location in the converted mass will be related directly to the structure of the original GBN at this location. The resulting structure of the CBN/CBN composite mass, thus, will be related to and controlled by the structural composition of the original GBN mixture.

The process may be illustrated by considering direction conversion of mixtures of turbostratic PBN particles with ideal structure HBN particles. HBN powder is available in the form of small individual ideal structure micron to sub-micron sized particles. Conversion of this HBN powder to CBN results in the formation of individual micron to sub-micron sized CBN particles bonded together in the converted CBN mass. Pyrolytic boron nitride (prepared by chemical vapor deposition or CVD) can be made in the form of large continuous turbostratic structure pieces with more or less orientation of the crystal planes depending on the deposition conditions. Conversion of PBN particles results in the formation of like-sized unitary continuous structure CBN particles with the same degree of crystallite orientation as the original PBN particles. Conversion of PBN/HBN powder mixtures, then, will result in the formation of CBN/CBN composite masses consisting of unitary continuous structure CBN particles resulting from conversion of the PBN particles within a micron to sub-micron size matrix resulting from conversion of the HBN powder fraction of the mixture.

While the disclosure herein may refer to mixtures of PBN and ideal structure HBN powder, the inventive process has equal applicability to other GBN mixtures in which the GBN components differ in structure-13 such structural differences including variation in the crystallinity, extent of continuous structure, and the like. The content of the various GBN components of the mixture may be varied at will. The references cited above detail the various forms of boron nitride as those skilled in the art will appreciate. The advantageous properties achieved by virtue of the resulting different structural form of the inventive CBN/CBN composite masses of the present invention will be illustrated in the following examples, which should be construed as illustrative and not limiting. In this application, all units are in the metric system and all percentages and proportions are by weight, unless otherwise expressly indicated. Also, all citations referred to herein are expressly incorporated herein by reference.

EXAMPLES

Example 1

A 30%/70% by weight mixture of −30 mesh PBN powder (which had been vacuum fired to a weight loss of 2%) and HBN powder (which had been vacuum fired to a 6% weight loss) was formed. A total of about 360 g of this mixture (5 g/cell) was pressed at about 60 Kbar and 1800°–2000° C. (heating time of 4 minutes). The recovered CBN/CBN composite masses then were milled to mesh size, cleaned, and sized. The 60/80 mesh fraction was nickel-coated for use in grinding tests.

Example 2

A 50%/50% by weight mixture of −12 mesh PBN particles (vacuum fired to a 1% weight loss) and HBN powder (vacuum fired to a 6% weight loss) was prepared, pressed, and milled, and a 60/80 mesh fraction nickel-coated as described in Example 1 above.

Example 3

Samples of the nickel-coated 60/80 mesh particles from Examples 1 and 2 were tested by dry grinding hardened M4 steel workpieces (resin bond 11V9 cup wheels). Comparison tests also were run at the same time with CBN 560 wheels, which utilize nickel-coated CBN powder as described in U.S. Pat. No. 4,289,503. The results are set forth below.

TABLE 1

| | Grinding Test Results Wheel speed: 20 m/sec Table speed: 2.44 m/min | | | |
|---|---|---|---|---|
| Abrasive | Infeed: GR* | 0.051 mm RGR** | Infeed: GR* | 0.076 mm GRR** |
| CBN 560 | 118 | 1.0 | 61 | 1.0 |
| Example #1 | 142 | 1.2 | 85 | 1.4 |
| Example #2 | 153 | 1.3 | 82 | 1.3 |

*GR = Grinding Ratio
**RGR = Relative Grinding Ratio

The above-tabulated data shows improved dry grinding results were achieved utilizing the novel CBN/CBN composite particles compared to a conventional commercially-available CBN particle.

Example 4

Figure 2:
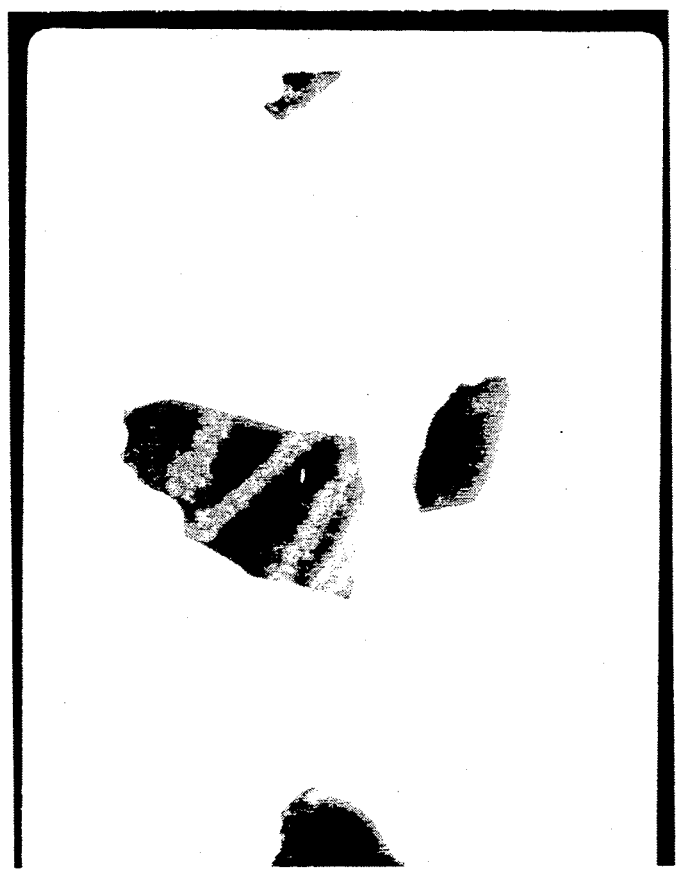

A 50/50 weight mixture of 6/12 mesh PBN powder (unfired) and HBN powder (vacuum fired to a 6% weight loss) was prepared and pressed as described in Example 1. The converted CBN/CBN product was milled to mesh sizes and cleaned. Light transmission photomicrographs then were taken of the resulting particles. FIG. 2 shows the structure of the particles obtained in which the light transmitting areas correspond to the directly converted PBN particles and the dark non-transmitting areas correspond to the directly converted HBN powder regions. The laminar nature of the structure resulted from the high aspect ratio shape of the PBN particles contained in the reaction mixture.

Example 5

Approximately 1,000 g each of the following mixtures of PBN powder with vacuum-fired HBN powder were pressed, milled to mesh size, and cleaned as described in Example 1 (cell load of 8 g/cell): Mix 2, 50 wt-%−140 mesh PBN (vacuum fired to 1.7 wt-% loss) and 50 wt-% HBN powder (vacuum fired to 6% weight loss); and Mix 4, 80 wt-%−50 mesh PBN (vacuum fired to 1.2% weight loss) and 20% HBN powder (vacuum fired to 6% weight loss).

Quantities of 100/120 mesh particles of Mixes 2 and 4 were fabricated into vitrified bond wheels and tested grinding 4140 steel workpieces. The test conditions and results recorded are set forth below.

Grinding Conditions:
Machine: Brown and Sharpe CNC Techmaster Surface Grinder.
Grinding Method: Creep Feed (Wet), up cut.
Wheel Spec.: CBN 100/120, 150 conc. VN1 bond.
Wheel Size: 178 D×6.3 W×31.75 H.
Workpiece: ASI 4140 steel, Rc-51, (150 L×100 W×50 T)
Wheel speed: 25 m/x
Work speed: 0.30 m/min.
Depth of cut: 1.0 mm
Width of cut: 3.53 mm
Coolant: Water soluble HD90 at 5%.
Truing Conditions:
Truer: 1A1 rotary diamond 150 D×2 W
Diamond spec.: MBS760, 40/50, 50 conc.
Wheel speed—CBN: 25 m/s
Speed ratio: 0.1 down cut
Radial depth of cut: 2.5 cm.
Cumulative depth: 0.1 mm
Lead: 0.30 mm/rev.
No dressing after truing was done.

After truing the first grind pass was made at a table speed of 0.05 m/min., the second pass at 0.10 m/min., third pass at 0.15 m/min., fourth pass at 0.20 m/min, fifth pass at 0.25 m/min., sixth pass at 0.30 m/min. at which point the table speed was kept constant until specific volume ground was 16.2 mm3/mm2. Note that each grind pass corresponds to a length of 150 mm at a depth of 1 mm.

The following data was recorded for Mix 2, Mix 4, and commercially available CBN-550 product, as described above.

TABLE 2

| Abrasive | Specific Volume Ground (mm³/mm²) | | |
|---|---|---|---|
| | 2.8 | 8.1 | 16.2 |
| | Grinding Ratio | | |
| Mix 2 | 546 | 1055 | 1948 |
| Mix 4 | 543 | 1406 | 2110 |
| CBN 550 | 336 | 791 | 1333 |
| | Specific Energy (w-hrs/cm³) | | |
| Mix 2 | 14.6 | 15.4 | 13.7 |
| Mix 4 | 14.6 | 14.8 | 14.8 |
| CBN 550 | 25.4 | 17.8 | 16.4 |

These results show improved grinding performance with respect to both grinding ratio and specific energy requirements for both the Mix 2 and Mix 4 samples compared to conventional CBN-550 powder.

Example 6

Similar tests with Mixes 2 and 4 samples were done in grinding 440C stainless steel workpieces. The test conditions are set forth below.

Grinding Conditions:
Machine: Brown and Sharpe CNC Techmaster Surface Grinder.
Grinding Method: Creep Feed (Wet), up cut.
Wheel Spec.: CBN 100/120, 150 conc. VN1 bond.
Wheel Size: 178 D×6.3 W×31.75 H.
Workpiece: 440C Stainless Rc-58, (150 L×100 W×50 T).
Wheel speed: 25 m/s
Work Speed: 0.15 m/min.
Depth of Cut: 1.0 mm
Width of cut: 3.51 mm
Coolant: Water Soluble HD90 at 5%.
Truing Conditions:
Truer: 1A1 rotary diamond 150 D×2 W
Diamond spec.: MBS760, 40/50, 50 conc.
Wheel speed-CBN: 25 m/s
Speed ratio: 0.7 down cut.
Radial depth of cut: 2.5 cm.
Cumulative depth: 0.1 mm.
Lead: 0.30 mm/rev.
No dressing after truing was done.

After truing the first grind pass was made at at table speed of 0.05 m/min., the second pass at 0.10 m/min., third pass at 0.127 m/min., fourth pass at 0.15 m/min. at which point the table speed was kept constant until specific volume ground was 16.1 mm3/mm2. Note that each grind pass corresponds to a length of 150 mm at a depth of 1 mm.

The following results were recorded.

TABLE 3

| Abrasive | Specific Volume Ground (mm³/mm²) | | |
|---|---|---|---|
| | 2.5 | 8.0 | 16.1 |
| | Grinding Ratio | | |
| Mix 2 | 393 | 904 | 1688 |
| Mix 4 | 393 | 1150 | 1948 |
| CBN 550 | 357 | 791 | 1101 |
| | Specific Energy (w-hrs/cc) | | |
| Mix 2 | 27.4 | 38.1 | 44.5 |
| Mix 4 | 25.8 | 35.6 | 43.4 |
| CBN 550 | 37.3 | 49.6 | 54.0 |

These results, in concert with the results of Example 5 with respect to 4140 steel workpieces, showed that Mixes 2 and 4 provided improvement in grinding performance compared to commercially available CBN 550 abrasive.

I claim:

1. In a high pressure/high temperature (HP/HT) process comprising a pressure of between about 50 Kbars and 100 Kbars and a temperature of at least 1,800° C. within the cubic boron nitride (CBN) stable region of the boron nitride (BN) phase diagram for making polycrystalline cubic boron nitride (CBN) masses from graphitic boron nitride (GBN) in the substantial absence of catalytically-active material, the improvement which comprises subjecting a mixture of different structural forms of GBN to said HP/HT process to simultaneously convert each form into its corresponding CBN form for making a CBN composite mass.

2. The process of claim 1 wherein said GBN is selected from different structural forms of one or more of pyrolytic boron nitride (PBN) and hexagonal boron nitride (HBN).

3. The process of claim 2 wherein said mixture comprises PBN and HBN in a weight ratio of from about 1:100 to 100:1.

4. The process of claim 1 wherein said GBN has been vacuum fired prior to its being subjected to said HP/HT process.

5. A cubic boron nitride (CBN) composite mass prepared by the high pressure/high temperature (HP/HT) simultaneous in situ conversion of different structural forms of graphitic boron nitride (GBN) n the substantial absence of catalytically-active material according to the process of claim 1.

6. The CBN composite mass of claim 5 which was prepared from a mixture of pyrolytic boron nitride (PBN) and hexagonal boron nitride (HBN).

7. The CBN composite mass of claim 5 wherein said GBN has been vacuum fired prior to its being subjected to HP/HT process.

* * * * *